United States Patent [19]

Hurter

[11] 4,211,698
[45] Jul. 8, 1980

[54] DISAZO DYES CONTAINING AN ACETOACETANILIDE MIDDLE COMPONENT

[75] Inventor: Rudolf Hurter, Basel, Switzerland

[73] Assignee: Ciba-Geigy Corporation, Ardsley, N.Y.

[21] Appl. No.: 934,551

[22] Filed: Aug. 17, 1978

[30] Foreign Application Priority Data

Aug. 23, 1977 [LU] Luxembourg .............................. 78014

[51] Int. Cl.² .................. C09B 31/02; C09B 33/02; C09B 62/08; C09B 62/50
[52] U.S. Cl. .................. 260/176; 260/146 R; 260/147; 260/148; 260/153; 260/154; 260/156; 260/157; 260/160; 260/199; 260/507 R
[58] Field of Search .................. 260/176, 156, 160

[56] References Cited

U.S. PATENT DOCUMENTS

| | | | |
|---|---|---|---|
| 1,594,865 | 8/1926 | Zitscher | 260/176 |
| 2,477,487 | 7/1949 | Kopp et al. | 260/160 |
| 3,900,460 | 8/1975 | Dehnert | 260/176 X |
| 3,963,694 | 6/1976 | Mory et al. | 260/157 X |
| 3,971,738 | 7/1976 | Fasciati et al. | 260/176 X |
| 4,035,350 | 7/1977 | Landler et al. | 260/176 X |
| 4,052,157 | 10/1977 | Fuchs et al. | 260/176 X |
| 4,118,381 | 10/1978 | Fuchs et al. | 260/176 X |

FOREIGN PATENT DOCUMENTS

| | | | |
|---|---|---|---|
| 511166 | 3/1955 | Canada | 260/193 |
| 310828 | 1/1956 | Switzerland | 260/146 R |
| 311487 | 1/1956 | Switzerland | 260/146 R |

*Primary Examiner*—Floyd D. Higel
*Attorney, Agent, or Firm*—Michael W. Glynn; Edward McC. Roberts

[57] ABSTRACT

The invention relates to novel azo dyes of the formula I

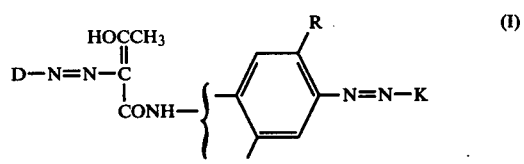

wherein R represents a water-solubilizing group, D represents the radical of a diazo component, and K represents the radical of a coupling component, to a process for their production and to a method of dyeing or printing natural or synthetic textile material and leather which comprises the use of the novel dyes.

5 Claims, No Drawings

DISAZO DYES CONTAINING AN ACETOACETANILIDE MIDDLE COMPONENT

The invention relates to novel azo dyes of the formula I

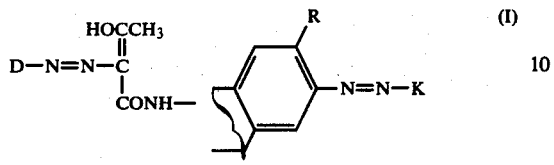

wherein
R represents a water-solubilising group,
D represents the radical of a diazo component, and
K represents the radical of a coupling component, a process for the production of these dyes and a method of dyeing or printing natural or synthetic textile material which comprises the use of the novel dyes as well as the natural or synthetic textile material, and also leather, dyed or printed therewith.

A water-solubilising group R is for example the —SO$_3$H, —SO$_2$NH$_2$, —SO$_2$NHCH$_2$CH$_2$SO$_3$H, —SO$_2$N(CH$_3$)CH$_2$SO$_3$H, —PO$_3$H$_2$, —COOH group or the

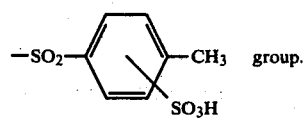

Preferably, R is the —SO$_3$H group.

A diazo component D can be a diazo component of any kind. It can be, for example, a diazo component of the aromatic or heterocyclic series. If D is the radical of an aromatic diazo component, it can be for example the radical of an aminobenzene and aminonaphthalene. If D is the radical of a heterocyclic diazo component, it can be in particular the radical of a 5- or 6-membered heterocyclic diazo component which contains for example nitrogen, oxygen or sulphur as heteroatom.

Such a radical can be for example the radical of an aminopyrazole, aminobenzpyrazole, aminothiazole and aminobenzthiazole.

All these radicals D can be further substituted by customary substituents of azo dyes, for example sulphonamide groups which can be mono- or disubstituted at the nitrogen atom; alkylamino groups; arylamino groups; alkyl groups which can be substituted for example by phenyl or halogen, for example the trifluoromethyl group; the nitro, cyano and hydroxyl group; alkoxy groups, such as the methoxy and ethoxy group; azo groups; halogen atoms, such as fluorine, chlorine or bromine atoms; and water-solubilsing groups of the kind defined for R, and fibre-reactive groups.

By fibre-reactive groups are meant those groups which contain one or more reactive groups or removable substituents which, on the application of dyes for example to natural polyamide fibres, such as wool, are able to react with the NH groups of these fibres to form covalent bonds. A large number of such fibre-reactive groups are known from the literature.

Suitable fibre-reactive groups are for example those of the aliphatic series, such as acryloyl, mono-, di- or trichloroacryloyl and mono-, di- and tribromoacryloyl, such as
—CO—CH=CH—Cl, —CO—CCl=CH$_2$,
—CO—CH=CHBr, —CO—CBr=CH$_2$,
—CO—CBr=CHBr, —CO—CCl=CH—CH$_3$,
and —CO—CCl=CH—COOH, —CO—CH=CCl—COOH, β-chloropropionyl-, 3-phenylsulfonylpropionyl-, 3-methylsulfonylpropionyl-, β-sulfatoethylaminosulfonyl-, vinylsulfonyl-, β-chloroethylsulfonyl-, β-sulfatoethylsulfonyl-, β-methylsulfonylethylsulfonyl-, β-phenylsulfonylethylsulfonyl-, 2-fluoro-2-chloro-3,3-difluorocyclobutane-1-carbonyl-, 2,2,3,3-tetrafluorocyclobutanecarbonyl-1-or -sulfonyl-1-, β-(2,2,3,3-tetrafluorocyclobutyl-1)-acryloyl-, α- or β-alkyl- or -arylsulfonyacryloyl-, such as α- or β-methylsulfonylacryloyl.

Reactive radicals particularly suitable for polyamide, most especially for wool, are: chloroacetyl, bromoacetyl, α,β-dichloropropionyl or α,β-dibromopropionyl, α-chloroacryloyl or α-bromoacryloyl, 2,4-difluoro-5-chloropyrimidyl-6, 2,4,6-trifluoropyrimidyl-5, 2,4-difluorotriazinyl-6 and fluorotriazinyl radicals of the formula

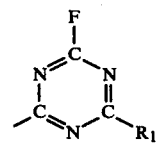

wherein R$_1$ represents an unsubstituted or substituted amino group or a free or etherified oxy or thio group, for example the NH$_2$ group, an amino group which is mono- or disubstituted by C$_1$–C$_4$ alkyl radicals, a C$_1$–C$_4$ alkoxy group, a C$_1$–C$_4$ alkylmercapto group, arylamino, in particular phenylamino, or phenylamino which is substituted by methyl, methoxy, chlorine and, in particular, sulfo; phenoxy, mono- or disulfophenoxy etc.

Examples of starting materials for introducing such triazine radicals are: 2,4-difluoro- or 2,4-dichloro-6-aminotriazine,2,4-difluoro- or 2,4- dichloro-6-methylaminotriazine, 2,4-difluoro- or 2,4-dichloro-6-ethylaminotriazine, 2,4-difluoro- or 2,4- dichloro-6-phenylaminotriazine,2,4-difluoro-or 2,4-dichloro-6-(2', 3'- or 4'-sulfophenyl)-aminotriazine,2,4-difluoro- or 2,4-dichloro-6-(2',4'- or 2',5'- or 4',5'-disulfophenyl)-aminotriazine, 2,4-difluoro- or 2,4-dichloro-6-dimethylaminotriazine,2,4-difluoro- or 2,4-dichloro-6-methoxytriazine, 2,4-difluoro-or 2,4-dichloro-6-(β-methoxyethoxy)-triazine, 2,4-difluoro- or 2,4-dichloro-6-methylmercaptotriazine and 2,4-difluoro- or 2,4-dichloro-6-phenylmercaptotriazine.

Particularly preferred reactive radicals are the α-bromoacryloylamino group and the α,β-dibromopropionylamino group. The former can be introduced either with bromacrylyl chloride or obtained from the α,β-dibromopropionyl group by dehydrobromination. The same also applies to the α-chloroacryl group. The 4,6-difluorotriazinyl-(2) or 4-fluoro-6-alkyl- or -arylaminotriazinyl-(2) groups are also of interest.

In addition, the radical D can contain a metallisable group, especially a hydroxyl group, in the ortho-position to the azo bridge and together with the hydroxyl group of the acetoacetyl radical can contain a metal atom, such as copper, nickel, chromium or cobalt, bonded as a complex.

In preferred azo dyes of the formula I, D represents the radical of an aromatic diazo component, in particular an aromatic radical, which contains a fibre-reactive group.

Suitable radicals K are for example those of the coupling components of the benzene, naphthalene and heterocyclic series, for example of the hydroxybenzene, aminobenzene, aminonaphthalene, hydroxynaphthalene, aminohydroxynaphthalene, pyrazolone, aminopyrazole, acetoacetarylamide and pyridone series cited for example in Swiss Patent specification No. 564,121. These radicals K can contain the customary substituents of azo dyes already referred to in the definition of D, fibre-reactive groups and groups able to form metal complexes, which are then preferably in the ortho-position to the azo bridge. If the radical K contains such metal complex forming groups in the ortho-position to the azo bridge, and if it is desired to form metal complex dyes at the radical K, then R represents the —COOH group.

Particularly interesting coupling components in this connection are aminohydroxynaphthalenesulphonic acids.

Because of the pure shades obtained with them on polyamide, preferred azo dyes are those of the formula Ia

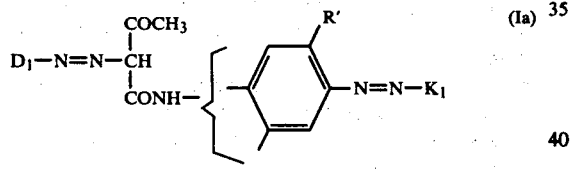

wherein
D₁ represents a phenyl radical which is further substituted by CH₃, SO₃H, COOH, OCH₃, OH, Cl, NO₂, SO₂NH₂ and/or NHCOCHBrCH₂Br,
R' represents SO₃H, COOH or

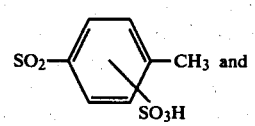

K₁ represents one of the following radicals:

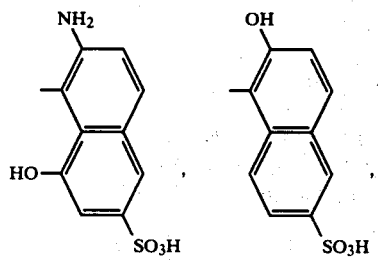

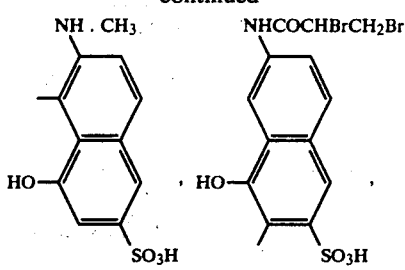

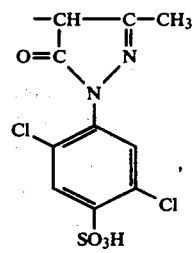

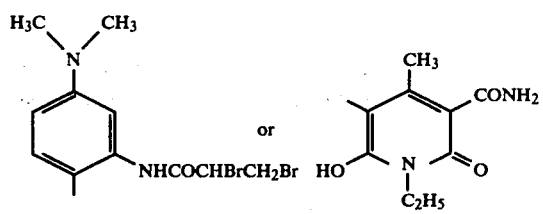

and also in particular those of the formula Ib

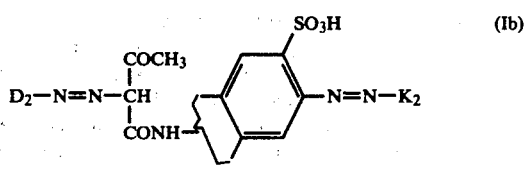

wherein
D₂ represents an aromatic radical which contains a fibre-reactive group, and
K₂ represents the radical of an aminohydroxynaphthalenesulphonic acid.

The novel azo dyes of the formula I are obtained for example by diazotising an acetoacetyl intermediate of the formula II

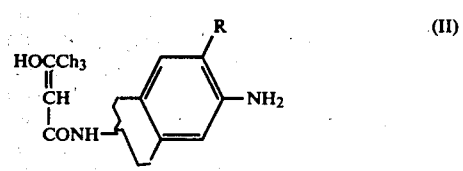

wherein R has the given meaning, coupling the diazonium salt to a coupling component HK which is couplable in an acid pH range, preferably in a pH range from 3 to 6, in an aqueous medium at a temperature of about 0° to 20° C., to give the azo dye of the formula (III)

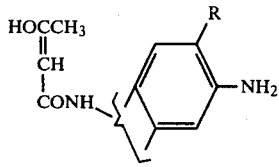

wherein R and K have the given meanings, and subsequently coupling a diazo component D—NH$_2$ to the coupling component of the formula III.

A further possibility of obtaining the azo dyes of the formula I consists in diazotising a diazo component D—NH$_2$ and coupling it to the acetoacetyl intermediate of the formula II. The resulting azo dye of the formula IV

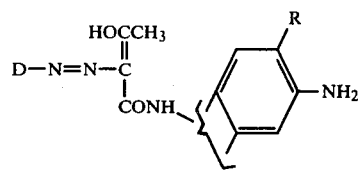

wherein R and D have the given meanings, is then diazotised and coupled to a coupling component HK in an aqueous medium at a temperature of 0° to 20° C. in an acid to alkaline pH range.

Furthermore, it is also possible to diazotise a compound of the formula

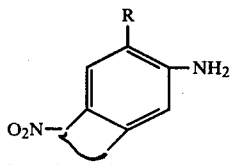

and to couple the diazonium compound thereby obtained to a coupling component HK. The nitro group of the resulting intermediate is then reduced to the amino group, which is acetoacetylated. Finally, an amine D-NH$_2$ is diazotised and coupled to the acetoacetyl compound.

The coupling and diazotisation reactions are carried out in a manner known per se (see e.g. Ullmanns Encyclopadie der technischen Chemie, Vol. 5, (1954), p. 783 ff).

If the azo dyes of the formula I additionally contain a metallisable group, such as a HO, COOH or NH$_2$ group, in the radical D in the ortho-position to the azo bridge, these dyes can be converted on the one hand with metal donors into 1:1 and 1:2 metal complex dyes or, on the other hand, with previously formed 1:1 metal complex dyes subsequently into an asymmetrical 1:2 metal complex dye. If the azo dyes of the formula I additionally contain a metallisable group in the radical K in the ortho-position to the azo bridge and R represents the COOH group, these dyes can also be converted into 1:1 or 1:2 metal complex dyes with metal donors or with previously formed 1:1 metal complex dyes respectively. It is thus possible to obtain metal complex dyes which contain the metal atom bonded at the radical D and/or K.

If the azo dyes of the formula I additionally contain acylatable amino groups, these dyes can subsequently be reacted with a reactive compound which introduces an acyl radical, for example the acetyl or benzoyl radical, or a fibre-reactive radical. Suitable reactive components for this reaction are for example those which are based on the above mentioned groups, in general halides, especially chlorides, of the cited components, whilst the condensation reaction is normally carried out in an aqueous or organic medium, advantageously in the presence of acid acceptors.

If the azo dyes of the formula additionally contain couplable positions, then these azo dyes can be reacted with a further diazo component to give polyazo dyes. If, on the other hand, the azo dyes of the formula I additionally contain diazotisable amino groups, these azo dyes can likewise be reacted with a further coupling component to give polyazo dyes.

The acetoacetyl intermediates of the formula II can be obtained by known methods. They are obtained for example by reacting a 1,3- or 1,4-phenylenediamine of the formula

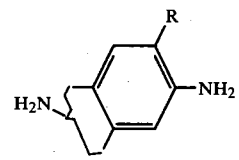

wherein R has the given meaning, with diketene in an aqueous solution at about pH 4 to 7 and a temperature of about 0° to 25° C.

From the large number of possible acetoacetyl intermediates of the formula II, selective mention may be made of the following:

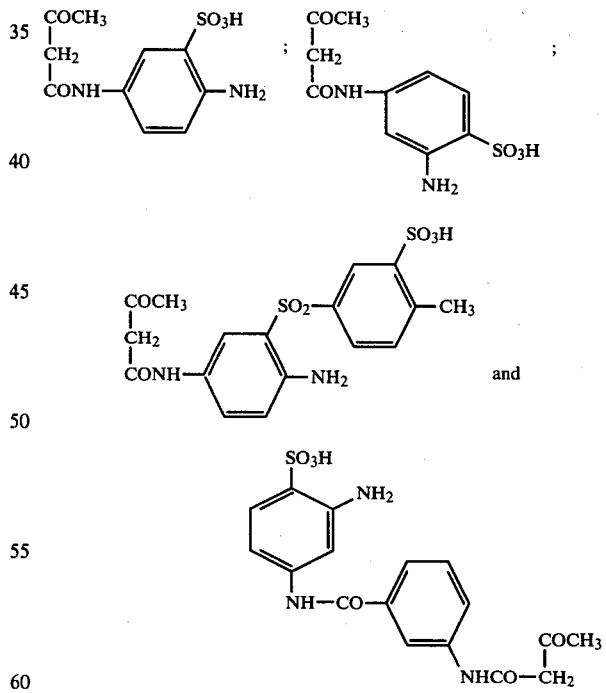

The coupling components HK to which the acetoacetyl intermediates of the formula II or the azo dyes of the formula IV are coupled, are known. They are for example phenols, such as phenol, cresol, p-tert-butylphenol; alkyl anilines, such as diethyl aniline and 3-dibromopropionylamino-N,N-dimethyl aniline; naphthols, such as 2-naphthol, 5,8-dichloro-1-naphthol; aminonaphtholsulfonic acids and acylamino- or alkyaminonaphtholsulfonic acids, such as 3-amino-8-naphthol-6-sulfonic acid, 1-amino-8-naphthol-3,6-disulfonic acid and 2-(N-methyl)- or -N-dibromopropionylamiono-8-naphthol-6-sulfonic acid; aminonaphthalenesulfonic acids, such as 2-aminonaphthalene-6-sulfonic acid and 2-amiononaphthalene-5-sulfonic acid; naphtholsulfonic acids, such as 2-naphthol-6-sulfonic acid; naphthalene derivatives, such as 2-phenylnaphthylamine; pyrazolones, such as 1-phenyl-3-methylpyrazolone-5; and pyridones, such as 1-ethyl-4-methyl-6-oxy-2-pyridone-3-carboxamide.

The diazo components $D-NH_2$, which are coupled to the azo dyes of the formula III or to the acetoacetyl intermediates of the formula II, are also known. As examples of such diazo components there may be cited:
1-amino-2-methylbenzene,
1-amino-2-hydroxy-5-chlorobenzene,
1-amino-2-hydroxy-5-nitrobenzene,
1-amino-2-hydroxybenzene-3-sulfonamide,
1-amino-3-α,β-dibromopropionylaminobenzene-6-sulfonic acid,
1-amino-4-α,β-dibromopropionylaminobenzene-6-sulfonic acid,
1-amino-4,a,β-dibromopropionylaminobenzene and
2-aminobenzoic acid.

The novel azo dyes of the formula I are distinguished by very good affinity for the substrate and the dyeings obtained therewith have good fastness properties, such as wet- and lightfastness, and also by pure shades.

The azo dyes of the formula I are used for dyeing and printing a very wide variety of natural and synthetic textile materials in any form of processing, such as fibres, filaments and woven fabrics, and also leather. If they are acid dyes which may contain fibre-reactive groups, they are used for dyeing and printing especially natural and synthetic polyamide material and also cellulosic material. If they are metal complex dyes they are used in particular for dyeing and printing wool, synthetic polyamide and leather. Dyeing is carried out in known manner by the continuous or by the exhaust method.

The invention is illustrated by the following nonlimitative Examples. The dyes or intermediates can be in the form of the free acid or of the alkali metal salt thereof, for example the sodium, potassium, lithium or ammonium salt, and also in the form of inner salt.

EXAMPLE 1

(A) Acetoacetylation 18.8 g (0.1 mole) of 1,3-phenylenediamine-4-sulfonic acid are dissolved in 100 ml of water at room temperature and pH 7 with the addition of conc. sodium hydroxide solution. The solution is cooled to 0°–5° C. and 9.1 ml (0.12 mole) of diketene are added dropwise in the course of 50 minutes. The reaction mixture is then stirred for 3 hours at room temperature and then filtered clear. The volume of the filtrate is 200 ml and the pH is 4.3. The pH is adjusted to 2.8 with conc. hydrochloric acid and the precipitation of the product is brought to completion by the addition of 10 g of solid sodium chloride. The precipitate is collected by filtration, washed with 15% sodium chloride solution and dried in vacuo at 60°–70° C., affording 21.57 g of the intermediate of the formula

(B) Diazotisation of the intermediate 27.2 g (0.1 mole) of the intermediate prepared in (A) are dissolved in 250 ml of water at room temperature and pH 7 with the addition of conc. sodium hydroxide solution. After addition of 25 ml of 4 N sodium nitrite (0.1 mole), the diazo solution is added dropwise to a mixture of 250 g of ice and 25 ml of conc. hydrochloric acid. The suspension of 2° C. is stirred for 20 minutes and a slight excess of nitrite is then destroyed with sulfamic acid.

(C) Coupling 23.9 g (0.1 mole) of 2-amino-8-naphthol-6-sulfonic acid (γ-acid) are dissolved in 250 ml of water of room temperature with conc. sodium hydroxide solution at pH 7 to 7.5. The solution is added dropwise in the course of 20 minutes to the suspension of the diazonium salt obtained in (B). The pH is kept at 2.8 to 3 with sodium acetate until it is constant after about 35 minutes. The pH is subsequently raised to 5.5 with conc. sodium hydroxide solution and a clear solution having a volume of 1080 ml is obtained. Then 162 g of sodium chloride are added and the batch is stirred for 60 minutes. The precipitate is collected by filtration, washed with 350 ml of 20% sodium chloride solution and dried in vacuo at 50° to 60° C., affording 57.48 g of the monoazo dye of the formula

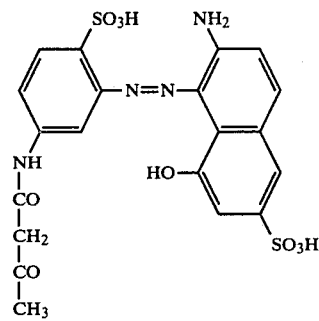

(D) Diazotisation of the second diazo component 1.07 g (0.01 mole) of o-toluidine are dissolved in 50 ml of water at room temperature with the addition of 2.5 ml of conc. hydrochloric acid and the solution is cooled to +2° C. Diazotisation is carried out with 10 ml of 1 N sodium nitrite at 0° C. to 3° C. The diazo solution is stirred for 10 minutes and then a slight excess of nitrite is destroyed with sulfamic acid.

(E) Coupling of the monoazo dye 5.22 g (0.01 mole) of the monoazo dye of (C) are dissolved in 150 ml of water with 2 N sodium hydroxide solution at pH 7 and 55° C. Then 5 ml, (0.02 mole) of 4 N sodium acetate are added and the mixture is cooled to 5° C. The solution of the diazonium salt of (D) is added dropwise in the course of 10 minutes while simultaneously keeping the pH constant at 7 with 2 N sodium hydroxide solution. After a further 30 minutes the resulting suspension is warmed to 30° C. and filtered. The dye is washed with 200 ml of 5% sodium chloride solution and dried at 50° to 60° C. in vacuo, affording 5.66 g of the red disazo dye of the formula

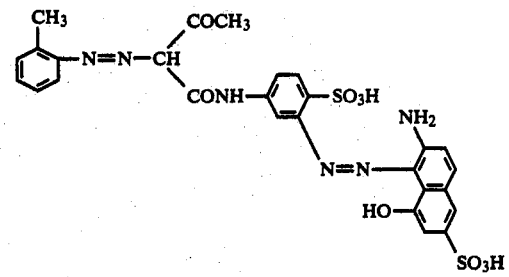

Disazo dyes of Examples 2 to 18 and 25 to 26 which dye polyamide, wool or cotton in the shades indicated in column V of the following table, are obtained by repeating the procedure of this Example but using the acetoacetyl intermediates of column II instead of that used in (A), and, after diazotisation, coupling them to the coupling components listed in column III and diazotising the diazo components of column IV and coupling these in turn to the monoazo dye obtained from II and III. Disazo dyes of Examples 19 to 24 which dye polyamide, wool or cotton in the shades indicated in column V are obtained by using on the other hand the diazo components listed in column IV and, after diazotisation, coupling them to the acetoacetyl compounds of column II and diazotising the monoazo dye obtained from II and IV and coupling it to the coupling components listed in column III.

Table

| Ex. | II Acetoacetyl intermediate | III Coupling component | IV Diazocomponent | V Shade on polyamid/wool |
|---|---|---|---|---|
| 2 | 4-amino-3-sulfo-phenyl acetoacetamide (COCH$_3$—CH$_2$—CONH—C$_6$H$_3$(SO$_3$H)(NH$_2$)) | 2-amino-8-hydroxy-naphthalene-6-sulfonic acid (coupling at position indicated) | 4-sulfo-3-amino-phenyl with NHCOCHBrCH$_2$Br | red |
| 3 | " | " | 4-amino-3-sulfo-phenyl with NHCOCHBrCH$_2$Br | red |
| 4 | " | " | 4-amino-phenyl with NHCOCHBrCH$_2$Br | red |
| 5 | " | 1-ethyl-3-carbamoyl-4-methyl-6-hydroxy-2-pyridone | 4-sulfo-3-amino-phenyl with NHCOCHBrCH$_2$Br | yellow |
| 6 | 4-amino-3-sulfo-phenyl acetoacetamide | 1-ethyl-3-carbamoyl-4-methyl-6-hydroxy-2-pyridone | 4-amino-phenyl with NHCOCHBrCH$_2$Br | yellow |

Table-continued

| Ex. | II Acetoacetyl intermediate | III Coupling component | IV Diazocomponent | V Shade on polyamid/wool |
|---|---|---|---|---|
| 7 | " | 7-amino-1-hydroxy-naphthalene-3-sulfonic acid (coupling at arrow, ortho to NH₂) | 2-amino-4-chlorophenol (OH, NH₂, Cl) | red |
| 8 | " | " | 2-amino-4-nitrophenol (OH, NH₂, NO₂) | red |
| 9 | " | " | 2-amino-4-sulfamoylphenol (OH, NH₂, SO₂NH₂) | red |
| 10 | 4-(acetoacetylamino)-2-aminobenzenesulfonic acid (NH₂, SO₃H, CH₂–COCH₃, CONH) | 7-methylamino-1-hydroxy-naphthalene-3-sulfonic acid (NHCH₃, OH, SO₃H; coupling at arrow) | 1,4-phenylenediamine N-(α,β-dibromopropionyl) (NH₂, NHCOCHBrCH₂Br) | red |

Table-continued

| Ex. | II Acetoacetyl intermediate | III Coupling component | IV Diazocomponent | V Shade on polyamid/wool |
|---|---|---|---|---|
| 11 | 4-methyl-3-sulfo-phenylsulfonyl linked to aniline with COCH₃—CH₂—CONH group (SO₃H, CH₃ on one ring; SO₂ bridge; NH₂, COCH₃CH₂CONH on other ring) | 6-amino-4-hydroxy-naphthalene-2-sulfonic acid (NH₂, OH, SO₃H on naphthalene; arrow indicating coupling position) | 4-amino-3-sulfo-phenyl with NHCOCHBrCH₂Br (NH₂, SO₃H, NHCOCHBrCH₂Br) | claret |
| 12 | 2-amino-4-(acetoacetylamino)-benzenesulfonic acid (NH₂, SO₃H, NHCOCH₂COCH₃) | " | 4-amino-3-sulfo-phenyl with NHCOCHBrCH₂Br (NH₂, SO₃H, NHCOCHBrCH₂Br) | red |
| 13 | " | " | 2-amino-4-chloro-phenol (OH, NH₂, Cl) | red |
| 14 | acetoacetyl-amino-benzenesulfonic acid with NH₂ (COCH₃—CH₂—CONH, SO₃H, NH₂) | 6-amino-4-hydroxy-naphthalene-2-sulfonic acid (NH₂, OH, SO₃H; arrow) | 2,6-dichloroaniline (NH₂, Cl, Cl) | red |

Table-continued

| Ex. | II Acetoacetyl intermediate | III Coupling component | IV Diazocomponent | V Shade on polyamid/wool |
|---|---|---|---|---|
| 15 | SO₃H–C₆H₃(NH₂)–NHCO–C₆H₄–NHCOCH₂–CO–CH₃ | " | 2-amino-4-chloro-anisole (OCH₃, NH₂, Cl) | red |
| 16 | CH₃–C₆H₃(SO₃H)–SO₂–C₆H₃(NH₂)–CH₂COHN–CO–CH₃ (COCH₃) | 6-amino-2-naphthol-...-sulfonic acid (NH₂, SO₃H; arrow) | o-toluidine (CH₃, NH₂) | red |
| 17 | SO₃H–C₆H₃(NH₂)–CH₂COHN–CO–CH₃ | 7-amino-4-hydroxy-naphthalene-2-sulfonic acid (NH₂, SO₃H, OH; arrow) | 2-amino-4-chloro-diphenyl ether (Cl, O, Cl, NH₂) | red |
| 18 | " | " | 4-aminoazobenzene (NH₂, N=N, C₆H₅) | red |

Table-continued

| Ex. | II Acetoacetyl intermediate | III Coupling component | IV Diazocomponent | V Shade on polyamid/wool |
|---|---|---|---|---|
| 19 | SO₃H, NH₂, NHCOCH₂COCH₃ (benzene) | 1-OH, 2-[NH-C₆H₄(2-Cl)]-N=C(CH₂)₄CH₃ coupled naphthalene-SO₃H (arrow at position) | 2-OCH₃, 3-NH₂, 5-Cl benzene | red |
| 20 | " | 2-OH, 6-SO₃H naphthalene (arrow) | " | orange |
| 21 | " | 1-OH, 6-NHCOCHBrCH₂Br, 3-SO₃H naphthalene (arrow) | 2-COOH, 1-NH₂ benzene | scarlet |
| 22 | " | N(CH₃)₂, NHCOCHBrCH₂Br benzene (arrow) | 1-NH₂, 2-SO₃H, 4-NHCOCHBrCH₂Br benzene | yellow |

Table-continued

| I Ex. | II Acetoacetyl intermediate | III Coupling component | IV Diazocomponent | V Shade on polyamid/wool |
|---|---|---|---|---|
| 23 | [structure: 4-acetoacetylamino-2-aminobenzenesulfonic acid derivative] | [structure: 2,5-dichloro-4-sulfophenyl acetoacetamide with arrow at CH₂] | [structure: aniline-SO₃H with NH–C(=N)–N=C(F)–C(Cl)=... containing F substituent] | yellow |
| 24 | " | " | [structure: aminobenzenesulfonic acid coupled to triazine bearing Cl and NH-phenyl-SO₃H] | yellow |
| 25 | " | [structure: 2-amino-8-hydroxynaphthalene-6-sulfonic acid, arrow at position 1] | [structure: aminobenzene-disulfonic acid with NH-triazine bearing F and OC₂H₅] | red |
| 26 | [structure: 4-acetoacetylamino-2-aminobenzenesulfonic acid derivative] | [structure: 2-amino-8-hydroxynaphthalene-6-sulfonic acid, arrow at position 1] | [structure: aminobenzenesulfonic acid with NH-triazine bearing F and NHCH₃] | red |

EXAMPLE 27

6.77 g (0.01 mole) of the diazo dye of Example 13 are dissolved at 80° C. in 130 ml of water with the addition of 4.4 ml of 2 N sodium hydroxide solution. Then 5 ml of 1 molar cobalt sulphate (0.005 mole) are added and the reaction mixture is stirred for ½ hour at 78°–82° C. The turbid solution is filtered clear and 58 g of potassium chloride are added. The precipitated dye is collected by filtration at 35° C., washed with 100 ml of 20% potassium chloride and dried at 50°–60° C., affording 6.25 g of the symmetrical 1:2 cobalt complex of the formula

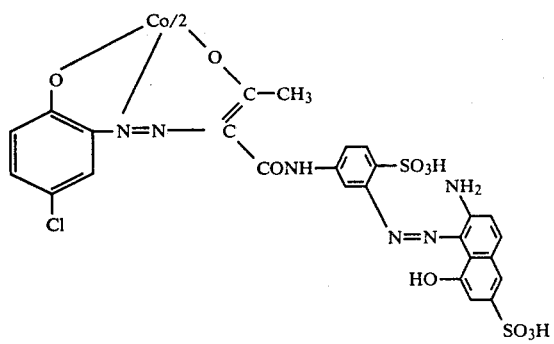

which dyes polyamide material in orange shades.

EXAMPLE 28

A piece of wool (10 g) is dyed for 30 to 90 minutes at a temperature of 98° C. in an aqueous liquor containing, based on the weight of the fabric, 4% by weight of ammonium sulfate, 1.5% by weight of 80% acetic acid, 1% by weight of Albegal B and 2% by weight of the dye of Example 14. The dyebath is then cooled to 80° C., neutralised by adding 2.5% by weight of 25% aqueous ammonia, and the goods are subjected to an aftertreatment for 15 minutes at this temperature. The dyed wool is then removed from the bath and washed and dried in the conventional manner. The wool is dyed in a pure red shade of good general fastness properties.

EXAMPLE 29

100 parts of clothing velours leather (dry weight) are wet back at 50° C. for 2 hours in a solution of 1000 parts of water and 2 parts of 24% ammonia and subsequently dyed for 1 hour at 60° C. in a solution of 1000 parts of water, 2 parts of 24% ammonia and 6 parts of the dye of Example 13. A solution of 40 parts of water and 4 parts of formic acid (85%) is then added and dyeing is continued for a further 30 minutes. The leather is then thoroughly rinsed and, if appropriate, treated for 30 minutes at 50° C. with 2 parts of a dicyandiamine/formaldehyde condensation product. A red dyeing is obtained. Other kinds of velour leather as well as glove leather can be dyed in the same manner.

EXAMPLE 30

3 parts of the dye obtained according to Example 22 are dissolved in 100 parts of water while adding 0.5 part of sodium m-nitrobenzenesulfonate. A cotton fabric is impregnated with the resultant solution to a liquor pickup of 75% and then dried.

The fabric is then impregnated with a warm solution of 20° C. which contains, per liter, 5 g of sodium hydroxide, and 300 g of sodium chloride, and squeezed out to a pick-up of 75%. The dyeing is steamed for 30 seconds at 100° to 101° C., rinsed, soaped for a quarter of an hour in a 0.3% boiling solution of a non-ionic detergent, rinsed and dried. The cotton is dyed in a brilliant red shade.

EXAMPLE 31

10 g of Helanca jersey are dyed in an aqueous liquor of 500 ml which contains 1 g/l of monosodium phosphate and is adjusted to pH 6 with disodium phosphate. The amount of dye of Example 15 is 2%, based on the weight of the fabric. The dyeing time at a temperature of 98° is 30 to 90 minutes. The dyed piece of Helanca is then removed from the bath and washed and dried in the conventional manner.

A red dyeing with a pure shade and very good general fastness properties is obtained.

What is claimed is:

1. Azo dyes of the formula

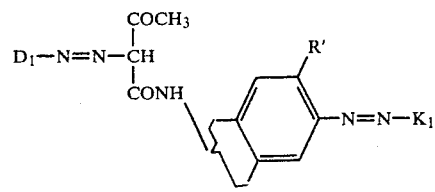

wherein $D_1$ represents a phenyl radical which is further substituted by one or more of $CH_3$, $SO_3H$, $COOH$, $OCH_3$, $OH$, $Cl$, $NO_2$, $SO_2NH_2$ $NHCOCHBrCH_2Br$, $R'$ represents $SO_3H$, $COOH$ or

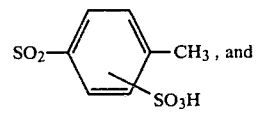

$K_1$ represents one of the following formulae:

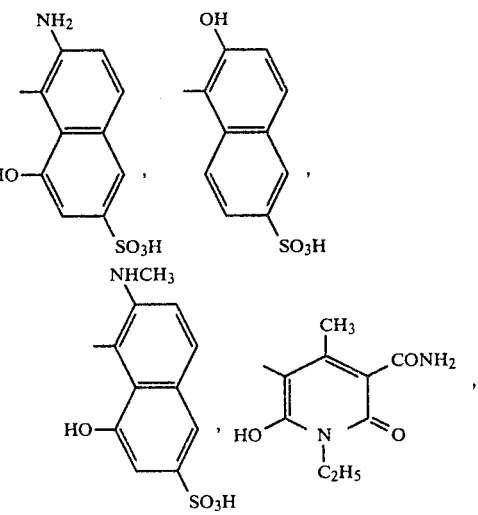

-continued
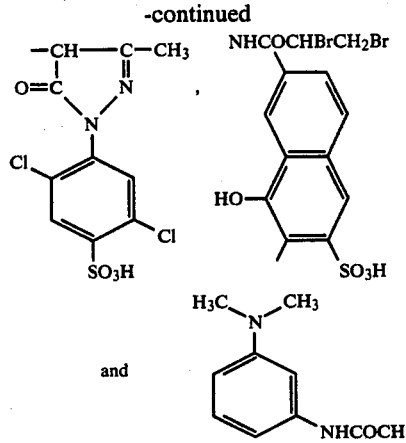
and
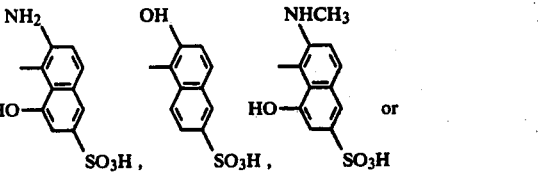
2. Azo dyes according to claim 1, wherein R' is $SO_3H$, $D_1$ substituted by $NHCOCHBrCH_2Br$, and $K_1$ is
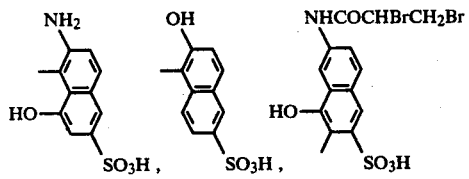
-continued
or
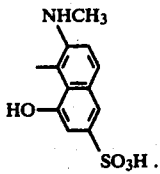
3. Azo dyes according to claim 1, wherein R is $SO_3H$.
4. Azo dyes according to claim 1, wherein $D_1$ is substituted by $NHCOCHBrCH_2Br$.
5. Azo dyes according to claim 1, wherein $K_1$ is
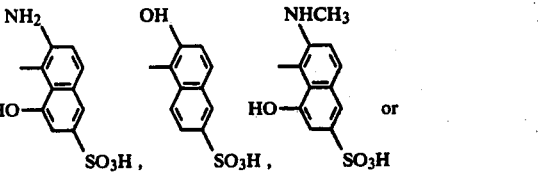
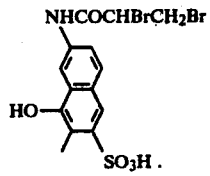
* * * * *